(12) United States Patent
Sakai

(10) Patent No.: US 7,404,635 B2
(45) Date of Patent: *Jul. 29, 2008

(54) HOLDING STRUCTURE OF SPECTACLE LENS, REPAIR METHOD FOR THE SAME, AND SPECTACLES

(75) Inventor: Yasushi Sakai, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/802,857

(22) Filed: May 25, 2007

(65) Prior Publication Data

US 2007/0222941 A1  Sep. 27, 2007

Related U.S. Application Data

(63) Continuation of application No. 10/537,552, filed as application No. PCT/JP2004/07376 on May 28, 2004, now Pat. No. 7,249,844.

(30) Foreign Application Priority Data

May 30, 2003 (JP) .............................. 2003-155813

(51) Int. Cl.
  *G02C 1/02* (2006.01)
(52) U.S. Cl. ........................................ 351/110; 351/41
(58) Field of Classification Search ................. 351/110, 351/124, 41; 29/20
  See application file for complete search history.

(56) References Cited

U.S. PATENT DOCUMENTS

| 5,646,706 A * | 7/1997 | Izumitani .................... 351/110 |
| 6,024,445 A | 2/2000 | Conner et al. |
| 6,250,755 B1 | 6/2001 | Conner et al. |
| 6,655,801 B2 | 12/2003 | Ng |
| 6,889,412 B2 * | 5/2005 | Xie ................................ 29/20 |
| 7,249,844 B2 * | 7/2007 | Sakai ........................ 351/110 |
| 2003/0058402 A1 | 3/2003 | Conner |

FOREIGN PATENT DOCUMENTS

| EP | 1 087 250 A1 | 3/2001 |
| JP | A-63-006521 | 1/1988 |
| JP | U-04-063419 | 5/1992 |
| JP | A-08-129151 | 5/1996 |
| JP | A-10-062721 | 3/1998 |
| JP | A-2000-171758 | 6/2000 |
| JP | A-2002-189195 | 7/2002 |
| JP | A-2002-529765 | 9/2002 |
| WO | WO 02/075435 A1 | 9/2002 |
| WO | WO 03/060595 A1 | 7/2003 |

* cited by examiner

*Primary Examiner*—Hung X Dang
(74) *Attorney, Agent, or Firm*—Oliff & Berridge, PLC

(57) ABSTRACT

A method is provided for securely holding a spectacle lens. Without using screwing members such as a screw and a nut, and extra parts such as a bush, a cylindrical pin and a slip-off preventive pin, a spectacle lens can surely be held. A taper pin is provided projecting on a lens holding member for holding a spectacle lens, and a taper hole having approximately the same size as the taper pin is provided on the spectacle lens. The taper pin is directly press-fitted into the taper hole, thereby holding the spectacle lens by a press-contact between an inner circumferential surface of the taper hole and an outer circumferential surface of the taper pin. The taper pin is press-fitted in a thickness direction of the spectacle lens.

13 Claims, 8 Drawing Sheets

[FIG.2]
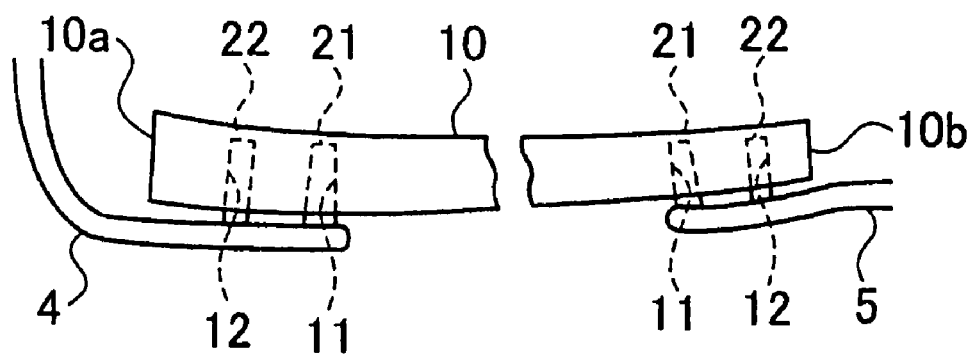
[FIG.3]
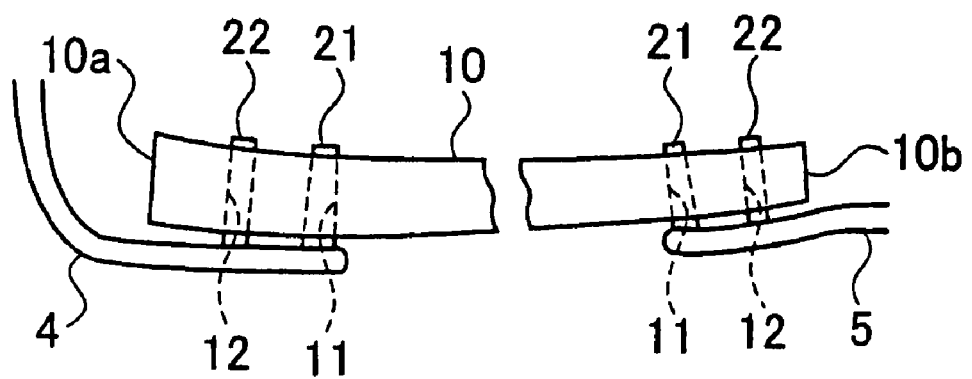

HOLDING STRUCTURE OF SPECTACLE LENS, REPAIR METHOD FOR THE SAME, AND SPECTACLES

This is a Continuation of application Ser. No. 10/537,552, filed Oct. 13, 2005, which in turn is a National Phase of PCT/JP04/07376, filed May 28, 2004. The disclosures of the prior applications are hereby incorporated by reference herein in their entirety.

TECHNICAL FIELD

The present invention relates to a holding structure of a spectacle lens preferably applied to spectacles of a rimless type, and a repair method for repairing the holding structure of the spectacle lens, and a spectacle frame using the holding structure of the spectacle lens, and spectacles using the holding structure of the spectacle lens.

BACKGROUND ART

In recent years, spectacles of a rimless type attract attention as spectacles having such advantages as to assure the width of visual fields and attain weight reduction. In one of the holding structures of a spectacle lens of the above-described spectacles of a rimless type, a screw insertion hole is formed penetrating the spectacle lens, the screw formed on the lens holding member is inserted into the screw insertion hole, and a nut is tightened to the tip of the screw, thereby holding the spectacle lens so as to put the spectacle lens between the lens holding member and the nut from the front and rear sides of the lens.

(For example, see Patent Document 1 and Patent Document 2).

However, when holding the spectacle lens by means of screwing members such as a screw and a nut, the problem is that the screw becomes loose easily. Therefore, the spectacle lens holding structure holding the spectacle lens by simply inserting a pin into the hole of the lens without using the screw is provided. The present invention relates to the spectacle lens holding structure designed to hold the spectacle lens by simply inserting the pin into the hole of the lens, without using the above-described screwing members such as a screw and a nut.

For example, in one of the holding structure of the spectacle lens for holding the spectacle lens by inserting the pin, a taper pin is inserted into a through hole formed on the spectacle lens through a bush, and by the inserting action of the taper pin, the bush is made expanded and by providing a pin slip-off preventive structure separately, the lens is held (For example, see Patent Document 3).

In another example of the above-described holding structure, a cylindrical pin having a slit and formed in the lens holding member is inserted into the through hole provided on the spectacle lens, and a slip-off preventive member is pushed into the cylindrical pin from the opposite side to expand the cylindrical pin by the slip-off preventive member, thereby bringing the cylindrical pin into press-contact with the hole to hold the lens (For example, see patent document 4).

[Patent document 1] Japanese Utility Model No. 04-63419
[Patent document 2] Japanese Patent Laid-open No. 63-6521
[Patent document 3] PCT Japanese Publication No. 2002-52976
[Patent document 4] Japanese Patent Laid open No. 2000-171758

DISCLOSURE OF THE INVENTION

Problem to be Solved

However, in a lens holding structure according to the patent document 3, a taper pin is inserted into a hole on a lens side through a bush, thereby increasing the number of fine parts, and making a through hole larger in diameter by a quantity required for the bush, and therefore the problem is that the strength of the lens is decreased. In addition, another problem is that since the bush is made of plastic and rubber, the bush may be cut and crushed, or since there is a possibility that the bush itself is deteriorated in quality, the lens and the frame may be shaken and unfastened. In addition, a slip-off preventive structure is separately required.

Further, in the lens holding structure according to the patent document 4, since the resin and rubber bush is not used, it is free of the above-described problems. However, in addition to providing a cylindrical pin having a slit on a lens holding member, the slip-off preventive member pushed into the cylindrical pin from the opposite side also needs to be prepared, thereby complicating the structure and increasing cost.

In view of the above-described circumstances, an object of the present invention is to provide a holding structure of a spectacle lens capable of surely holding the spectacle lens with a simple structure, without using screwing members such as a screw and a nut, and extra parts such as a bush, a cylindrical pin, and a slip-off preventive pin, and a repair method for repairing the holding structure of the spectacle lens, and a spectacle frame applied to the holding structure of the spectacle lens, and spectacles using the holding structure of the spectacle lens.

Means to be Solved

A first aspect of the present invention provides a holding structure of a spectacle lens applied to spectacles of a rimless type in which a taper pin formed in tapered shape having a thin tip end side is provided projecting on a lens holding member for holding the spectacle lens, a taper hole having a taper of approximately the same size as the taper pins is formed on the spectacle lens, the taper pin is directly press-fitted into the taper hole, and by bringing the inner circumferential surface of the taper hole into press-contact with the outer circumferential surface of the taper pin, the spectacle lens is held.

The size of the taper is expressed by the ratio of the difference of diameter of both ends to the length of the taper pin, or is defined as an angle (taper angle) formed by a center axis of the taper and a generating line of the tapered surface. Also, the size of the taper can be defined as "$\tan\theta$" when the taper angle is set to be $\theta$.

In this case, the spectacle lens made of plastic is usually used because it is difficult to be broken by press-fitting the taper pin. The press-contact force between the taper pin and the tapered hold is determined by a friction coefficient between the pin and the lens, and a force by which the lens tends to shrink. In the present invention, by the direct press-contact between the outer circumferential surface of the taper pin and the inner circumferential surface of the taper hole, a lens holding force can be obtained (without using a bush). Therefore, without shaking and unfastening, the lens can be surely held.

In addition, by directly press-fitting the taper pin into the taper hole, the number of fine parts (such as a bush and a slip-off preventive pin) can be reduced, thereby simplifying the structure and design. Further, by only using a thin taper pin without using the bush and cylindrical pin, the diameter of the hole provided on the spectacle lens side can be made small, thereby preventing the lens strength from lowering. Accordingly, the above-described lens holding structure can be applied to a thin lens without developing so much trouble. Moreover, the hole can be made close to the edge of the lens, thereby easily ensuring the width of effective visual fields. Moreover, the part (attachment patch) on the lens holding member side, to which the taper pin is attached, can be made small, thereby enabling easing restriction in design.

In the holding structure of the spectacle lens of a first aspect of the present invention, a direction in which the taper pin is press-fitted is not limited, including the case where the taper pin is press-fitted into the taper hole bored in the edge surface of the spectacle lens. However, the holding structure of the spectacle lens of a second aspect of the present invention limits the structure in such a way the taper hole is bored in a thickness direction of the lens, and taper pin is press-fitted thereinto in the thickness direction of the spectacle lens.

As described above, when limiting the structure so that the taper pin is press-fitted in a thickness direction of the lens, that is, the taper hole is bored in the surface of the lens, and the taper pin is press-fitted to the taper hole, the following advantage can be obtained. That is, generally, the attachment patch having the taper pin attached thereto is easy to enter the field of view of a wearer, but according to the present invention as described above, the diameter of the taper pin and the taper hole can be made small, and the attachment patch can be made small accordingly, with the less influence on the visual field of the wearer. In addition, the taper pin is press-fitted from the front surface of the spectacle lens as frequently done. In this case, since the nut is not used at the side of the rear surface (concave surface) and not hindered by an extra part on the rear side of the lens, the side of the rear surface of the spectacle lens can be made simple and clear (concave surface).

A third aspect of the present invention provides the holding structure of the spectacle lens according to either of the first or second aspect of the present invention, in which irregularity means is provided on at lest either of the outer circumferential surface of the taper pin or the inner circumferential surface of the taper hole, so as to increase an engaging force in a slip-off direction of the taper pin when both surfaces are press-contacted with each other. Thus, the irregularity means is capable of further restricting the slip-off of the taper pin. As the irregularity means, a mat finish surface or a satin finish surface may be provided on the outer circumferential surface of the taper pin (fourth aspect of the present invention), or grooves such as annular grooves or spiral grooves may be provided on the outer circumferential surface of the taper pin along the circumferential direction (fifth aspect of the present invention). The irregularity means can be more easily provided on the side of the taper pin than provided on the inner circumferential surface of the taper hole.

In addition, the size of the taper is preferably set to be in a range of ⅕₂₅ to ⅟₁₀₀ (sixth aspect of the present invention). The above range allows the taper pin to be press-fitted into the taper hole with sufficient strength, without damaging the taper hole of the lens.

A seventh aspect of the present invention provides the holding structure of the spectacle lens according to any one of the first to sixth aspects of the present invention, in which the taper pin has a mark fixed thereon to specify a predetermined press-fitting amount into the taper hole of the spectacle lens.

When press-fitting the taper pin into the taper hole, the taper pin may be press-fitted while measuring the press-fitting force by a method of some kind. However, a special measuring apparatus is accordingly required for measuring the press-fitting force. Therefore, in the seventh aspect of the present invention, the taper pin has a mark fixed thereon to specify a predetermined press-fitting amount. Thus, when the taper pin has a mark fixed thereon to specify the press-fitting amount, and is press-fitted into the taper hole up to the position as specified by the mark, a desired press-fitting force can be generated between the taper hole and the taper pin. Thus, the taper pin can be press-fitted into the taper hole easily with a press-fitting amount uniform without variation. Moreover, by setting a press-fitting start position to a specified distance from the position of the mark, the diameter of the taper hole to be subjected to machining is accordingly determined. Then, referring to the diameter thus obtained, the machining of the taper hole is preferably conducted.

An eighth aspect of the present invention provides the holding structure of the spectacle lens according to any one of the first to seventh aspects of the present invention in which a rotation preventive means is provided for the lens holding members and the spectacle lens, the rotation preventive means preventing the relative rotation of the taper pin and the taper hole in a state that the taper pin is press-fitted into the taper hole.

By press-fitting only one taper pin into only one taper hole, there is a possibility that the taper pin starts rotating in the taper hole when an external force acts thereon. When starting rotation, the lens is accordingly rotated, and in addition, the press-contact surface between the taper pin and the taper hole is loosened. Therefore, in an eighth aspect of the present invention, the rotation is prevented by the rotation preventive means to prevent the loosened press-contact surface between the taper pin and the taper hole, thus maintaining a reliable press-contact force.

Various kinds of the rotation preventive means are conceivable. However, in a ninth aspect of the present invention, a rotation preventive pin different from the taper pin is provided projecting on the lens holding member, and a pin insertion hole different from the taper hole is bored in the spectacle lens. The rotation preventive pin is inserted into the pin insertion hole, to prevent the relative rotation of the taper pin and the taper hole. To put it briefly, by inserting two pins into the holes of the lens, the rotation is prevented. If the two pins are provided, the taper pin can be used as the rotation preventive pin. However, when press-fitting the two taper pins, higher precision is required for the shapes of the taper pins and the taper holes, and intervals between the pins and the holes. Therefore, not a taper pin but a straight pin is more preferable as a rotation preventive pin in terms of an ease of manufacture.

In addition, in a tenth aspect of the present invention, the rotation preventive pin and the taper pin are parallelly arranged with a specified distance, and the pin insertion hole and the taper hole are parallelly arranged with a specified distance.

When the two pins are thus parallelly arranged, there are advantages such that the design of pin attachment parts of the lens holding members is simplified to contribute to the ease of machining, and the two pins can be simultaneously inserted into the holes on the lens side. Note that the distance between the taper pin and the rotation preventive pin (distance between a root part of the taper pin and the rotation preventive pin) is preferably set to be 0.5 mm or more, so that the strength of the lens can be ensured and a reliable rotation preventive force can be obtained (eleventh aspect of the present invention).

A position of the rotation preventive pin is not particularly limited to the lens surface. In a twelfth aspect of the present invention, the taper pin is press-fitted into the taper hole formed on the lens surface of the spectacle lens, and the rotation preventive pin is inserted into the pin insertion hole formed on the edge surface of the spectacle lens.

When the rotation preventive pin is thus inserted into the edge surface of the spectacle lens, only the taper pin may be inserted into the hole formed on the lens surface side. Therefore, the structure and design on the lens surface side can be simplified.

In a thirteenth aspect of the present invention of a holding structure of a spectacle lens, the rotation preventive pin and the pin insertion hole are arranged with a minute space therebetween. With this structure, machining precision can be intentionally loosened slightly. By filling a resin into the minute space between the rotation preventive pin and the pin insertion hole, the rotation preventive pin is prevented from moving. The rotation preventive pin is preferably selected to be a straight pin, and the pin insertion hole is preferably selected to be a straight hole in terms of an ease of manufacture and machining.

The rotation preventive means is not limited to a pin. In a fourteenth aspect of the present invention, the rotation preventive means has a structure in which a recessed groove is formed on the spectacle lens, and a part of the lens holding member is fitted into the recessed groove.

Note that taper pin may be press-fitted into the taper hole under the condition that an adhesive is injected thereinto. (Fifteenth aspect of the present invention).

A sixteenth aspect of the present invention provides a repair method of a holding structure of a spectacle lens according to any one of the first to fifteenth aspects of the present invention, which is a method for repairing the loosened relationship between the taper hole and the taper pin and repairing a damage or modification of the hole, comprising:

injecting a liquid resin into the taper hole from which the taper pin is taken out;

in this state, the taper pin or the taper pin made for repair only is inserted halfway into the taper hole to secure a slight space in a diameter direction between the taper hold and the taper pin;

under such a condition, allowing the liquid resin to be cured; and after obtaining the cured resin, the taper pin is press-fitted thereinto, or after taking out the taper pin made for repair only, the taper pin is press-fitted thereinto.

As described above, when the resin is cured, with the taper pin floated, the taper hole having the taper of the same size as the taper pin and having a smaller diameter than the diameter before repairing can be easily formed. In addition, when the taper pin is press-fitted into the taper hole after the resin thus injected is cured, the resin functions as a caulking material. Specifically, not by an adhesive force of the resin, but by the press-fitting force exerted by the press-fitting of the taper pin, the lens holding force can be obtained. Thus, the loosened part can be repaired and the main purpose of the present invention is achieved.

A seventeenth aspect of the present invention provides spectacles having the holding structure of the spectacle lens according to any one of the first to fifteenth aspects of the present invention, the holding structure being used for a fixed part of endpiece of a spectacle frame and the spectacle lens, or the fixed part of a bridge and the spectacle lens.

An eighteenth aspect of the present invention provides a spectacle frame for which the holding structure of the spectacle lens according to any one of the first to fifteenth aspects of the present invention is used.

BEST MODE FOR CARRYING OUT THE INVENTION

Preferred embodiments of the present invention will be explained based on the drawings hereafter.

FIG. 1 is a block diagram showing the whole structure of the spectacles of a rimless type to which a holding structure of a spectacle lens of an embodiment of the present invention is applied, wherein FIG. 1A is a view of the spectacles viewed from above, and FIG. 1B is a front view of the spectacles. FIGS. 2 and 3 are enlarged views showing lens holding structure parts in the spectacles. FIG. 2 is different from FIG. 3 in that FIG. 2 shows a case in which a pin is inserted into the hole on the lens side as a non-through hole, and FIG. 3 shows a case where the pin is inserted into the hole on the lens side as a though hole.

As shown in FIGS. 1 to 3, in spectacles 1, the holding structure of the spectacle lens of the embodiment of the present invention is applied to a fixed part of endpieces 4 of a spectacle frame 2 and spectacle lenses 10, and the fixed part of a bridge 5 and the spectacle lenses 10. The endpieces 4 are attached to each tip of the right and left temples 3 by way of hinges.

In the lens holding structure used for the fixed part of the endpieces 4 and the spectacle lenses 10, and the fixed part of the bridge 5 and the spectacle lenses 10, respectively, taper pins 21 formed in tapered shape having a thin tip end side are provided projecting on the lens holding members (endpieces 4 and bridge 5), taper holes 11 having tapers of approximately the same size as the taper pins 21 are formed on the spectacle lenses 10, and the taper pins 21 are directly press-fitted into the taper holes 11, and by bringing the inner circumferential surfaces of the taper holes 11 into press-contact with the outer circumferential surfaces of the taper pins 21, the spectacle lenses 10 are held. In this case, the taper holes 11 are bored in a thickness direction of the spectacle lenses 10, and the taper pins 21 are press-fitted thereinto in the thickness direction of the spectacle lenses 10. Note that in this case, the taper holes are provided from the front surface in the thickness direction of the lenses, and the taper pins are press-fitted thereinto from the front surface. However, the taper holes may be provided from the rear surfaces of the lenses in the thickness directions thereof, and the taper pins may be press-fitted thereinto from the rear surfaces of the lenses.

The lenses 10 are made of plastic including a polycarbonate resin, an acrylic resin, a urethane resin, and a polyamide resin, for example. The sizes of the tapers are set in a range of $\frac{1}{25}$ to $\frac{1}{100}$.

In addition, in the lens holding members (endpieces 4, bridge 5) and the spectacle lenses 10, rotation preventive means for preventing the relative rotation of the taper pins 21 and the taper holes 11 are provided, with the taper pins 21 press-fitted into the taper holes 11. In this embodiment, as the rotation preventive means, rotation preventive pins 22 formed of straight pins, and pin insertion holes 12 formed of straight holes are provided. The rotation preventive pins 22 and the pin insertion holes 12 are parallelly arranged with specified distances. Here, the distances between the pins 21 and the pins 22 (distances between the roots of the pins) are respectively set to be 0.5 mm or more. Also, the diameters of the rotation preventive pins 22 are set to be 1.0 mm, and the diameters of the pin insertion holes 12 are set to be 1.03 mm, respectively. Thus, with the rotation preventive pins 22 inserted into the pin insertion holes 12, slight spaces are formed around the rotation preventive pins. Therefore, the rotation preventive pins are fixed by filling transparent resins in the spaces thus formed.

As shown in FIG. 2, the taper holes 11 and the pin insertion holes 12 may be non-through holes. However, here, as an example, explanation will be given to a case where through holes are provided as shown in FIG. 3. When the non-through hole is provided, an advantage is that wiping off of sticking dirt on the surface of the lens is eased, if no holes are opened thereon. Meanwhile, when the through hole is provided, an advantage is that by pushing the tips of the taper pins 21 press-fitted into the taper holes 11 with a proper jig (tip of a fine pin) from the side opposite to the press-fitting side, the taper pins 21 are easily unfastened, which is effective for the case where the taper pins 21 need to be unfastened while repairing.

Regarding the arrangement of the taper pins 21 and the rotation preventive pins 22, as shown in FIG. 2 and FIG. 3, when the taper pins 21 and the rotation preventive pins 22 are parallelly arranged, it is preferable that the taper pins 21 are arranged in the insides of the spectacle lenses 10 (farther side from the edge surfaces of the lenses), and the rotation preventive pins 22 are arranged outsides of the lenses (edge surfaces of the lenses) in terms of securing strength of the lenses. Specifically, if the taper pins 21 are disposed closer to the edges of the lenses, there is a high possibility of damaging the lenses while press-fitting. Therefore, the taper holes 21 (center of the holes) is preferably set to the position of about 2 mm or more distant from the edge surfaces of the lenses.

When the lens holding is conducted by combination of the taper holes 11 and the taper pins 21, as shown in FIG. 4A, the taper hole 11 is firstly opened on the spectacle lens 10. The machining of the hole on the lens side is conducted by using a taper reamer having the same taper angle as that of the taper pin 21. As shown in FIG. 5A, the machining of the taper hole 11 is conducted so that the straight hole 11$d$ having diameter d1 is firstly opened. Subsequently, as shown in FIG. 5B, machining of the taper hole 11 having diameter d2 is conducted as a finish by the taper reamer from above the straight hole 11$d$. When opening the taper hole 11 with a diameter of a large diameter at d2=100 mm, the lower hole of the straight hole is opened with diameters at d1=0.85 to 0.95 mm, and then by using the taper reamer of 1/50 (tip end 0.6 φ, upper end 1.2 φ), the lens is cut until the diameter of the upper hole becomes as thick as 1.0 mm.

After opening the taper hole 11 on the spectacle lens 10, as shown in FIG. 4B, the taper pin 21 is inserted into the taper hole 11 of the lens 10. Even if not applying a load up to a point where the diameter of the taper pin 21 and the diameter of the taper hole 11 coincide, the taper pin 21 can be inserted. From the point where both diameters coincide, (press-fitting start position), the press-fitting force is applied to the taper pin 21. Then, as shown in FIG. 4C, while spreading the taper hole 11 of the lens 10, the taper pin 21 is press-fitted thereinto.

At this time, in a case of an elastic lens 10, force F by which the lens tends to shrink works from the inner circumferential surface of the taper hole 11 to the outer circumferential surface of the taper pin 21. When the force is expressed by taper angle=$\theta$, as a component of the force F, a force (F cos $\theta$) which is going to push-in the taper pin 21 sideward, and a force (F sin $\theta$) which is going to push-back the taper pin 21 work.

For example, when the size of the taper pin is designated as "1/50", the force relations by which the taper pin 21 is press-fitted into the taper hole 11 are expressed as follows:
$\theta$=0.573° (taper angle of 1/50)
Component of a force which works sideward=F cos $\theta$=0.99995 F
Component of a force which works in a pushing back direction=F sin $\theta$=0.01 F If a press-contact force which works on a tapered surface is designated as F=1000 gf, the force (F sin $\theta$) of only 10 gf which is going to push back the taper pin 21 works, and this is a neglible value. Meanwhile, a lateral force (F cos $\theta$) by which the taper pin 21 is prevented from slipping off is designated as 999.95 gf, and this value shows almost no reduction. At this time, the force by which the taper pin 21 is held is determined by a friction coefficient of the taper pin 21 and the lens 10 and the force by which the lens is going to shrink. Accordingly, for enhancing a fixing force of the press-contact surface, it is important to push the taper pin 21 into the taper hole by applying a strong pressure thereto, and roughen the press-contact surface by increasing the friction coefficient.

The press-fitting force of the taper pin 21 is suitably determined by taking into consideration the diameters of a pin and a hole, a taper angle, length of the pin, thickness of the lens, distance from the edge of the hole, and a lens material. For example, by using a lens thin in thickness at a position of the lens hole and therefore considered low in strength, an experiment was conducted under the following condition. As a result, it was found that when the taper pin was press-fitted into the hole by a press-fitting force of 7 kgf to 10 kgf, the lens was not broken, and the pin and the lens was connected with a sufficient strength.

(Experiment Condition)
Position of the taper hole: The center of the taper hole is 2 mm distant from the edge of the lens.
Thickness at the position of the hole: 1.8 mm
Pin: Material (Ti alloy)
: Taper of 1/50, maximum diameter of 1.1 mm, length (2.5 mm)
Lens: Material (Urethane resin; refractive index of 1.6, Product of HOYA CORPORATION)

As a method for raising the binding force of the press-contact surface between the taper pin 21 and the taper hole 11, it is effective to provide irregularity means (slip-off preventive means) in a slip-off direction of the taper pin, on at least either of the outer circumferential surface of the taper pin 21 or the inner circumferential surface of the taper hole 11 so as to increase an engagement force. When the elasticity is different between the taper pin and the lens, either of which having lower elasticity has preferably the irregularity means formed thereon. The reason is that a contact area between the taper pin and the taper hole is increased, thereby raising further the binding force. For example, in case of a metal taper pin, the taper pin has the irregularity means formed thereon. The irregularity means is generally formed in such a way that, as shown in FIG. 6A, a roughened front surface such as a mat finish surface (formable by means of sandblast and plating) and a satin finish surface is provided on the outer circumferential surface of the taper pin 21, or as shown in FIGS. 6B, 6C, and 6D, grooves in the circumferential directions intersecting the pin insertion directions are provided. The kinds of the grooves include just ring grooves as shown in FIG. 6B, spiral grooves as shown in FIG. 6C, and linear grooves as shown in FIG. 6C, and in addition net-like grooves as shown in FIG. 6D. In FIG. 6D, the net-like grooves are partially formed around the circumference of the taper pin, and the same net-like grooves are formed on the rear side thereof also. However, the net-like grooves also may be formed all around the circumference of the taper pin.

The grooves as described above may be formed while forming the taper pin, or may be marked later. A laser marking device cab be used for marking.

In case of a plastic lens, the lens is softer and has more elasticity than a pin. Therefore, if provided with a roughened surface of the taper pin 21, the inner diameter of the taper hole 11 on the lens side is pushed onto the taper pin 21, and the lens is thereby deformed by adapting to the surface shape of the pin and brought into contact with the pin. Thus, the contact area between the taper pin and the taper hole is increased, thereby increasing the friction coefficient accordingly, to prevent the taper pin 11 from slipping off.

The taper pin 21 may be press-fitted into the taper hole 11 in a state that an adhesive is injected into the taper hole 11. In this case, when a concavo-convex is formed on the surface of the taper pin 11, the concavo-convex becomes a storage part of the adhesive, and therefore an improvement in an adhesive force can be expected.

Next, the length of the taper pin 21 (the same is as the rotation preventive pin 22) will be explained.

The length of the taper pin 21 is preferably set to be a proper length corresponding to a depth of the taper hole 11. The reason is that the longer the length of the taper pin 21 protruding from the lens is, the more likely that the lens wipe-off is inhibited or the visual field of a wearer is disturbed. Meanwhile, the shorter the length of the taper pin 21 is, compared with the depth of the taper hole 11, the smaller the contact area between the taper pin 21 and the inner wall of the taper hole 11 becomes. In this case, the problem is that connection strength between the pin and the lens lowers accordingly.

According to a first method for suitably setting the length of the pin, as shown in FIGS. 7A to 7C, plural kinds of taper pins 21 having different lengths L1 to L3 are preliminarily prepared. Then, when the thickness of the lens is determined, a taper pin 21 having a most proper length corresponding to the thickness of the lens is selected. For example, when there is a taper pin among plural kinds of taper pins, having approximately the same length as the depth of the taper hole of the lens, it is preferably selected. When there is no such a taper pin, the taper pin having a length closest to the depth of the taper hole of the lens may be selected. In this case, if the taper pin having a shortest protruding length is selected among the taper pins protruding from the lenses, the contact area between the side wall of the taper pin and the inner wall of the taper hole is made large, and therefore the holding strength can be increased, thereby inhibiting the visual field of the wearer from being damaged. Moreover, as in the case where there is no pin having the length longer than the depth of the taper hole of the lens, when the taper pin is selected among the pins having the length shorter than the depth of the taper hole, the taper pin having the length closest to the depth of the taper hole is preferably selected, in terms of contact area which can be made large. In addition, according to a second method for suitably setting the length of the pin, the lens holding member having a longer taper pin 21 is preliminarily prepared, and when the lens holding member is attached to the lens, the tip of the pin is cut by adapting to the thickness of the lens. In this case, it is preferable that one taper pin can deal with a large range of thickness of the lens.

As described above, by using the taper pin 21 having a proper length, a sufficient holding strength of the lens can be secured, without being hindered by the pin.

Next, directionality of the taper hole 11 will be explained.

As shown in FIG. 8A, the taper hole 11 is preferably bored in a spherical center direction of a base curve of the lens 10. The reason is that, for example, as shown in FIG. 8B, as an axis of the taper pin 21 is shifted from the spherical center direction of the base curve of the lens 10, the area (cross hatching part) brought into full contact between the circumference of the taper pin 21 and the inner surface of the taper hole 11 in a direction vertical to the insertion direction of the taper pin 21 becomes accordingly narrower, thereby lowering the connection strength of the taper pin and the taper hole.

Also, as shown in FIG. 13A, a corner part of the root of the taper pin is frequently protruded from the side surface of the taper pin. (Such a part is referred to as a fillet part hereafter). The fillet part is formed in a case where a brazing material or the fusion part of a base material is swelled out at the time of connecting the taper pin and the lens by brazing and welding, or in a case where the strength is secured by connecting with a smooth curved surface at the time of forming the taper pin by a press die. Thus, the fillet part is formed in the root of the taper pin, and even when press-fitting the taper pin up to the part near the fillet part, as shown in FIG. 13A, the taper hole 11 is preferably bored in the spherical center direction of the base curve of the lens 10. For example, as shown in FIG. 13B, as the axis of the taper pin 21 is shifted from the spherical center direction of the base curve of the lens 10, the contact area between the taper pin 21 and the inner surface of the taper hole 11 becomes accordingly smaller, thereby raising the possibility that the contact strength is lowered.

Next, a press-fitting method will be explained.

Basic matter in press-fitting the taper pin is to insert it with a predetermined pressure. In the press-fitting method, the taper pin 21 may be press-fitted while measuring the pressure when press-fitted. However, here, the shape of the taper pin 21 and the shape of the taper hole 11 are preliminarily set so as to obtain a predetermined press-fitting force by inserting the taper pin 21 until it reaches a predetermined position preliminarily set. Thus, a special tool for measuring the pressure is not required, thereby facilitating the work.

In order to properly set the press-fitting amount, as shown in FIG. 9, a mark (such as a line) 21e for specifying the predetermined press-fitting amount into the taper hole 11 of the spectacle lens 10 is preferably fixed on the outer circumferential surface of the taper pin 21. That is, by press-fitting the taper pin 21 into the taper hole 11 until the mark 21e reaches the upper edge of the taper hole 11, the predetermined press-fitting force is generated. Here, the press-fitting force (press-fitting height) indicates height dimension S with which the taper pin is inserted from a contact state between the taper pin 21 and the inner wall of the taper hole 11 in a non-pressure state (press-fitting start position), and for example, the dimension S is preferably set to be about 0.5 to 1 mm. Thus, by fixing the mark 21e on the taper pin 21, and by press-fitting the taper pin 21 up to the position of the mark 21e, a desired press-fitting force can be generated between the taper hole 11 and the taper pin 21 with an amount uniform without variation, which contributes to a stable lens holding quality by a comparatively easy work. Note that the mark is not limited to a line, etc, but may be a groove, a recess or projection, and a step, etc, if the position can be specified by the shape.

FIG. 15 is a view showing an example of fixing a mark 21e on the outer circumferential surface of the taper pin 21 for specifying the specified press-fitting amount, and fixing a mark 21f on the tip side of the pin for specifying the press-fitting start position. The mark is not particularly limited in the same way as the mark 21e specifying the predetermined press-fitting amount. However, in the example of FIG. 15, the mark is formed of a groove. When the taper pin is press-fitted into the taper hole by specifying the press-fitting start position 21f by a recessed part such as a groove and injecting an adhesive, the mark showing the press-fitting start position preferably serves as a storage part of the adhesive after press-fitting. Here, the press-fitting start position corresponds to a height position up to which the taper pin 21 gets into the taper hole in a non-pressure state, and usually the diameters are matched between the diameter of the taper pin 21 and the diameter of the taper hole 11. Then, heights of the mark showing the press-fitting start position and the mark showing the predetermined press-fitting amount are set in advance, so that the predetermined pressure is generated. In this case, as shown in FIG. 15A, the taper hole 11 is machined so that the press-fitting start position 21*f* of the taper pin 21 is positioned on the upper edge of the taper hole 11. Then, as shown in FIG. 15B, the taper pin 21 is press-fitted into the taper hole 11 until the mark showing the predetermined press-fitting amount reaches the upper edge of the taper hole 11. In this case, the machining amount of the taper hole can be determined by referring to the mark 21*f* of the press-fitting start position, thereby facilitating the machining of the taper hole 11.

In the holding structure of the spectacle lens having the above-described structure, the lens holding force is obtained by the direct press-contact between the outer circumferential surface of the taper pin 21 and the inner circumferential surface of the taper hole 11 (without using a bush). Therefore, the lens is surely held without shaking and unfastening. Moreover, the number of fine parts (such as a bush and a slip-off preventive pin) can be reduced, thereby simplifying the structure, and also simplifying the design.

Further, without using the bush and a cylindrical pin, only the thin taper pin 21 and the rotation preventive pin 22 are used, thereby making the diameters of the holes 11 and 12 on the spectacle lens 10 side small to prevent lowering of the strength of the lens. Particularly, by making the diameter of the pin small, a pin attachment patch on the lens holding member side (endpieces 4 and bridge 5) can also be made small, to enable easing restriction in design. Moreover, in addition to the simple structure, the hole formed on the lens 10 can be made small. Therefore, the holding structure of the spectacle lens having the above-described structure can be applied to a thin lens without developing so much trouble.

In addition, in the holding structure of the spectacle lens of the above-described embodiments, the taper pin 21 and the rotation preventive pin 22 are inserted in the thickness direction of the lens, and therefore the attachment patch to which the above-described pins are attached is easy to come into the visual field of the user. However, as described above, by the smaller specified diameter of the pin, the attachment patch can also be made small, and the taper hole 11 can be made closer to the edge of the lens, resulting in less influence on the visual field of the wearer. Also, without using a nut, the rear side of the lens can be simple and clear not hindered by an extra part.

Moreover, in the holding structure of the spectacle lens of the above-described structure, a rotation preventive pin 22 is arranged in parallel to the insertion direction of the taper pin 21, thereby easily simplifying the design of the pin attachment part of the lens holding members (endpieces 4 and bridge 5), and facilitating the machining. In addition, two taper pins 21 and 22 can be simultaneously inserted into the taper holes 11 and 12, and the rotation preventive pin 22 and the pin insertion hole 12 are capable of functioning to guide the insertion direction of the taper pin, thereby improving the easiness in assembling work also. In addition, by more largely opening the pin insertion hole 12 than the size of the rotation preventive pin 22, a machining precision for setting the distance between the pins 21 and 22, and the distance between the holes 11 and 12 can be intentionally loosened slightly.

In addition, the slight space between the rotation preventive pin and the pin insertion hole is fixed by filling a resin therein. In a filling method of the resin, for example, the resin may be preliminarily filled in the pin insertion hole 12 before the rotation preventive pin is inserted, or after insertion, the space between the rotation preventive pin and the pin insertion hole may be filled. The kinds of the resin that can be used include, for example, an epoxy resin, an acrylic resin, a urethane resin, and a rubber resin. A transparent resin is more preferable, and the resin having a refractive index close to the refractive index of the lens is further preferable.

In the embodiments described above, a straight pin is selected as the rotation preventive pin 22, and a straight hole is selected as the pin insertion hole 12, and therefore the above-described effect can further preferably be obtained with a simple structure.

Also, when the spectacle having the above-described structure is subjected to a temperature test, the slip-off of the pin did not occur. The condition of the temperature test is as follows:

(1) After left to stand in an environment at 50° for 30 minutes, the spectacles are left to stand at −20° for 30 minutes.
(2) 20 cycles of this is repeated.
(3) Thereafter, the environment is back to a room temperature, and a pin pull-off load of 1 kgf is applied.

Next, the pin rotation preventive structure other than the above-described structure will be explained.

As described before, two or more pins are previously prepared and it is effective that at least one of them is selected to be a taper pin 21. In this case, as shown in FIG. 10A, the two pins 21 and 22 can be laterally arranged as shown in FIG. 10A, the two pins can be vertically arranged as shown in FIG. 10B, or the two pins can be obliquely arranged also without difficulty functionally, and whichever of them can be freely selected as design requires.

Moreover, for example, the position to form the rotation preventive pin 22 is not particularly limited to the surface of the lens. As shown in FIG. 11, the rotation preventive pin 22 may be inserted into the edge surface 10*a* of the spectacle lens 10, with the taper pin 21 press-fitted into the surface of the lens of the spectacle lens. Thus, if one pin 22 is arranged on the edge surface 10*b* side, easy layout is provided for the taper pin 21 on the lens surface side. Moreover, in press-fitting, an adhesive is preliminarily applied or filled in the insertion hole of the rotation preventive pin, and in this state, the rotation preventive pin may be inserted into the pin insertion hole simultaneously with the press-fitting of the taper pin, and the rotation preventive pin and the inner wall of the insertion hole are thereby bonded with each other. With this structure, the taper pin can more surely be fixed.

In addition, the rotation of the taper pin can be prevented without using the pin. As shown in FIG. 12, in one of the rotation preventive means, a recessed groove 15 is formed on the spectacle lens 10, and a part of the lens holding member (endpiece 4) is fitted into the recessed groove 15 on the lens side by using one pin in this case.

In FIG. 14, in another example of the rotation preventive means, the recessed groove is formed on the edge of the spectacle lens 10 along the insertion direction of the taper pin, and a part of the lens holding member (endpiece 4) is fitted thereinto by using one pin in this case also.

Next, a repair method for repairing the above-described holding structure of the lens, when the relation between the taper hole 11 and the taper pin 21 is loosened will be explained.

The above repair method comprises:
injecting a liquid resin (adhesive) into the taper hole 11 from which the taper pin 21 is taken out;
in this state, inserting the taper pin 21 halfway into the taper hole 11 to secure a slight space in a direction of the diameter between the taper hole 11 and the taper pin 21;
under this condition, allowing the resin to be cured; and
after obtaining the cured resin, press-fitting the taper pin 21.

For example, the halfway insertion of the taper pin 21 is conducted in such a way that in a case of the taper pin 21 of 1/50, the taper pin 21 of about 1 mm is pulled out from the taper hole 11 to form a slight space of about 0.02 mm in a direction of the diameter. Under this condition, the resin is cured. The kinds of the resin that can be used include, for example, an epoxy resin, an acrylic resin, a urethane resin, and a rubber resin. Note that the transparent resin is preferable, the transparent resin is more preferable, and the resin having a refractive index close to the refractive index of the lens is further preferable.

As described above, when the resin is cured with the taper pin floated, the taper hole having a taper of the same size as the taper pin and having a smaller diameter than the diameter before repairing can be easily formed. In addition, when the taper pin 21 is press-fitted into the taper hole 11 after the resin thus injected is cured, the resin functions as a caulking material. Specifically, not by an adhesive force of the resin, but by the press-fitting force exerted by the press-fitting the taper pin, the lens holding force can be obtained. Thus, the loosened part can surely be repaired. Here, the taper pin of the holding part was used for repair. However, a taper pin of exclusive use for repair, which is a tool of exclusive use for repair having the same taper, can also be used. In this case, it is necessary to remove the tool after the resin is cured, and therefore a taper part is preferably weak in adhesive strength with the adhesive. For example, the taper pin is preferably made of metal, glass, and rubber, etc,. In addition, the taper pin may also be made of the resin having small friction coefficient such as a fluorocarbon resin or the material coated by the same.

Moreover, regarding the method for press-fitting the taper pin, in the above-described embodiments, the taper pin 21 was press-fitted into the taper hole 11 in an environment of a room temperature. However, the taper pin 21 may also be fitted into the taper hole in a preliminarily heated state of the spectacle lens. In this case, by the shrinkage of the lens when it returns to a room temperature, the taper pin 21 can further securely be fixed.

In addition, in the above-described embodiments, although rotation is prevented by the means (such as a rotation preventive pin 22) different from the taper pin 21, it also is possible to form the section of the taper pin into a non-rotational shape such as an elliptic shape or a polygonal shape, so that the taper pin itself has a function to prevent the rotation.

Also, in the above-described embodiments, although the taper pin 21 is press-fitted into the surface of the lens of the spectacle lens 10, it is also possible to constitute the holding structure of the spectacle lens so that the taper pin 21 is press-fitted into the edge surfaces 10a and 10b of the spectacle lens 10.

INDUSTRIAL APPLICABILITY

As described above, according to the present invention, without using screwing members such as a screw and a nut, and extra parts such as a bush, a cylindrical pin, and a slip-off preventive pin, with a simple structure, the spectacle lens can surely be held without shaking.

BRIEF DESCRIPTION OF THE DRAWINGS

FIG. 1 is a block diagram showing the whole structure of spectacles to which a holding structure of a spectacle lens of an embodiment of the present invention is applied.

FIG. 2 is an enlarged view showing a first example of a lens holding structure part in the spectacles of FIG. 1.

FIG. 3 is an enlarged view of a second example of the lens holding structure part in the spectacles of FIG. 1.

FIG. 4 are views showing a relationship between taper pins and taper holes in the holding structure of the spectacle lenses.

FIG. 5 are explanatory views of a process in which the taper holes are formed.

FIG. 8 are explanatory views concerning the orientations of the taper pins, wherein

FIG. 9 are explanatory views of a press-fitting method of the taper pins, wherein

FIG. 10 are explanatory views of rotation preventive means in the holding structure of the spectacle lens, wherein

FIG. 11 are views showing other examples of the rotation preventive means, wherein

FIG. 13 are other explanatory views of the orientations of the taper pins, wherein

FIG. 15 are other explanatory views of the press-fitting method of the taper pins, wherein

DESCRIPTION OF THE SIGNS AND NUMERALS

Figure 1A:
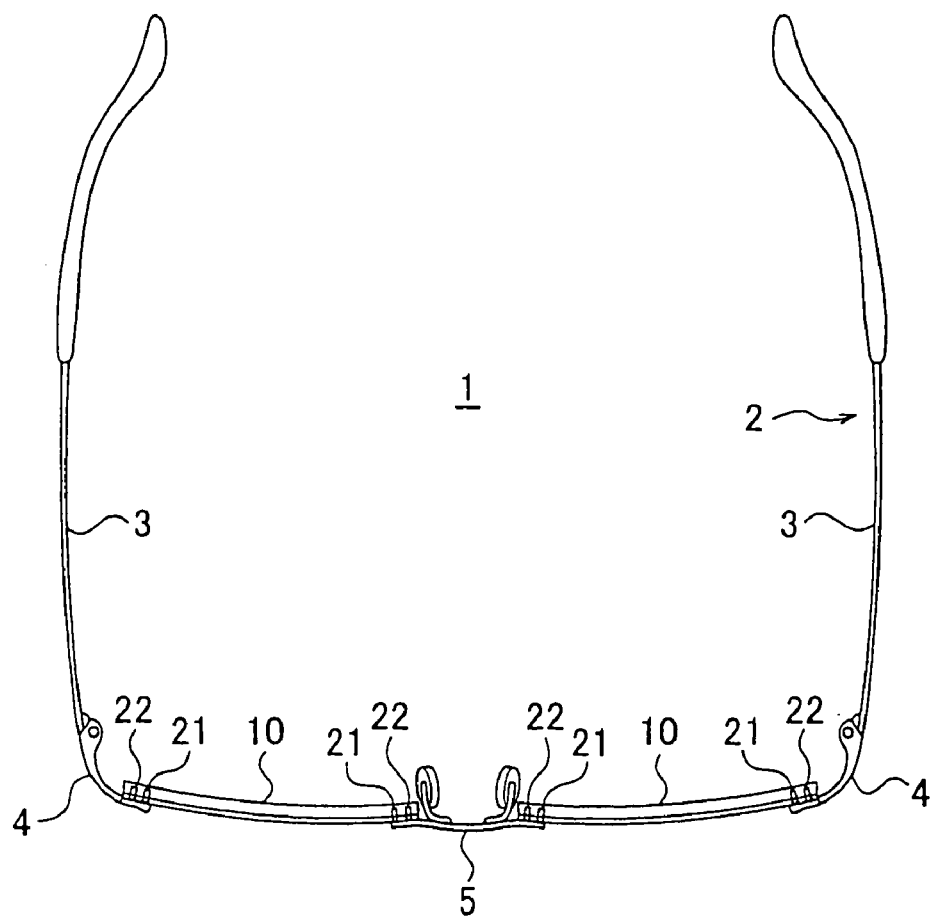
FIG. 1A is a view showing the spectacles viewed from above.
Figure 1B:
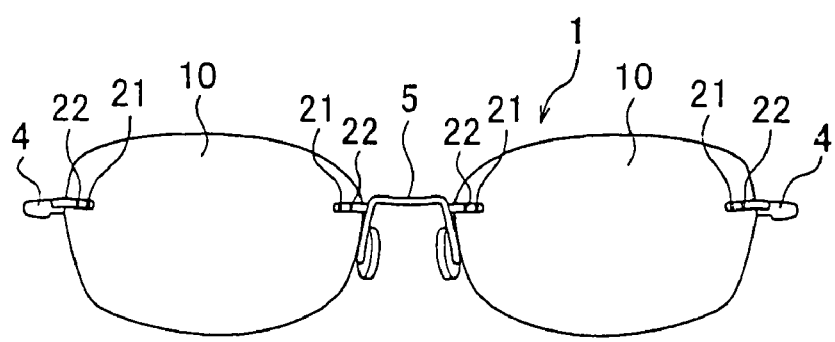
FIG. 1B is a front view of the spectacles.
Figure 4A:
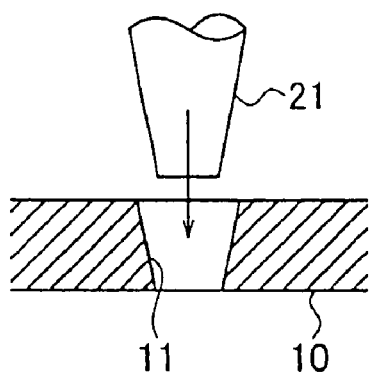
FIG. 4A is a view showing a state before press-fitting the taper pin into the taper hole.
Figure 4B:
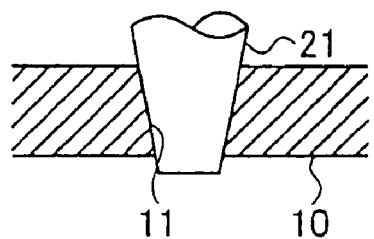
FIG. 4B is a view showing a state after press-fitting the taper pin into the taper hole.
Figure 4C:
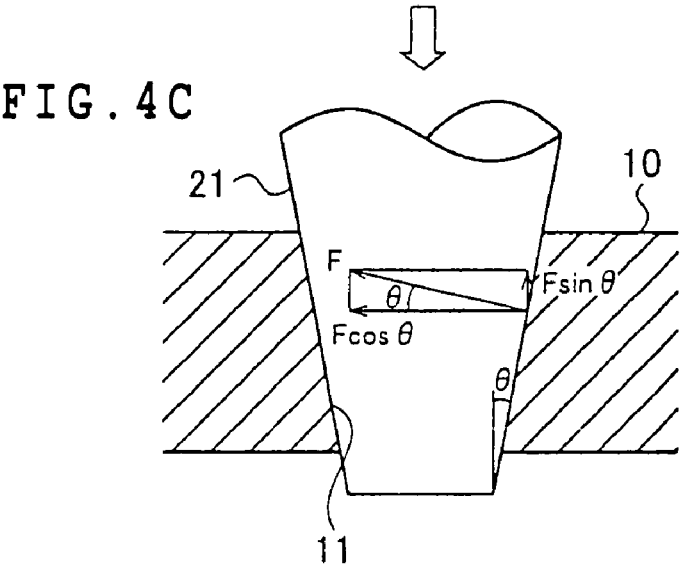
FIG. 4C is a view showing a force relationship in a state after press-fitting the taper pin.
Figure 5A:
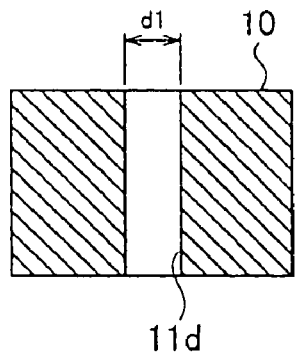
FIG. 5A is a sectional view showing a stage in which a lower hole is made.
Figure 5B:
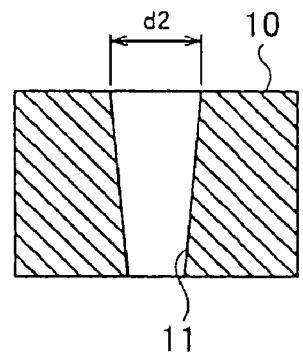
FIG. 5B is a sectional view showing a stage in which the lower hole is finished into a taper hole.
Figure 6A:
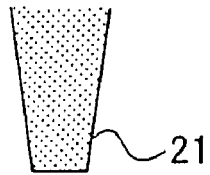
FIG. 6A to FIG. 6D are views showing irregularity means formed respectively on the surfaces of the taper pins.
Figure 6B:
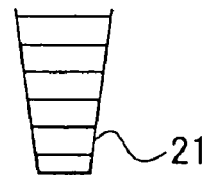
Figure 6C:
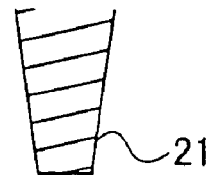
Figure 6D:
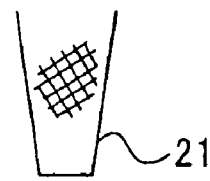
Figure 7A:
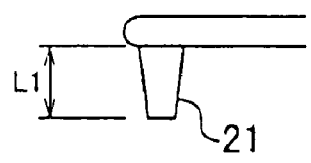
FIG. 7A to FIG. 7C are views showing the taper pins made different in lengths.
Figure 7B:
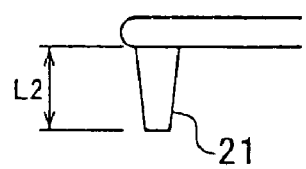
Figure 7C:
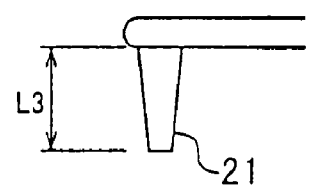
Figure 8A:
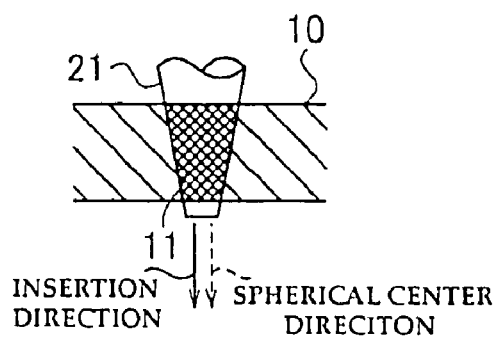
FIG. 8A is a sectional view showing an example of press-fitting the pin in a spherical center direction of a lens.
Figure 8B:
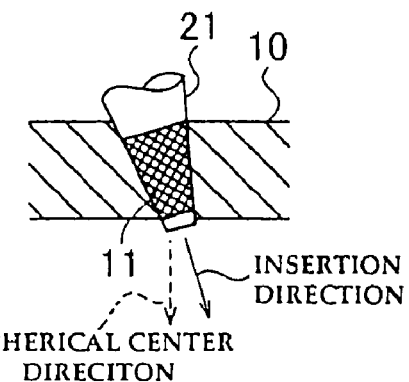
FIG. 8B is a sectional view showing an example of press-fitting the pin in a direction shifted from the spherical center direction of the lens.
Figure 9A:
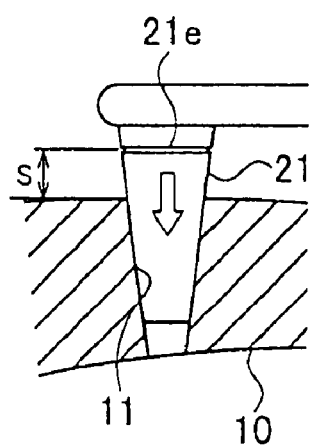
FIG. 9A is a sectional view of the state before press-fitting the taper pin.
Figure 9B:
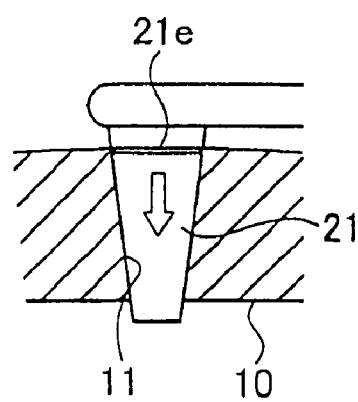
FIG. 9B is a sectional view showing the state at the time of completing the press-fitting of the taper pin.
Figure 10A:
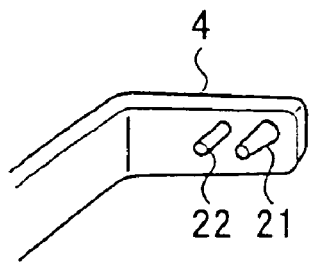
FIG. 10A is a view showing an example of laterally arranging two pins.
Figure 10B:
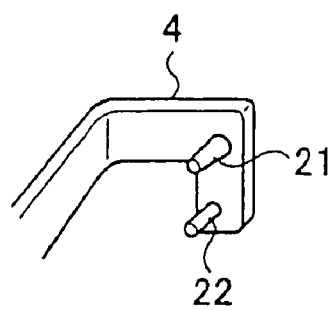
FIG. 10B is a view showing an example of vertically arranging the two pins.
Figure 11A:
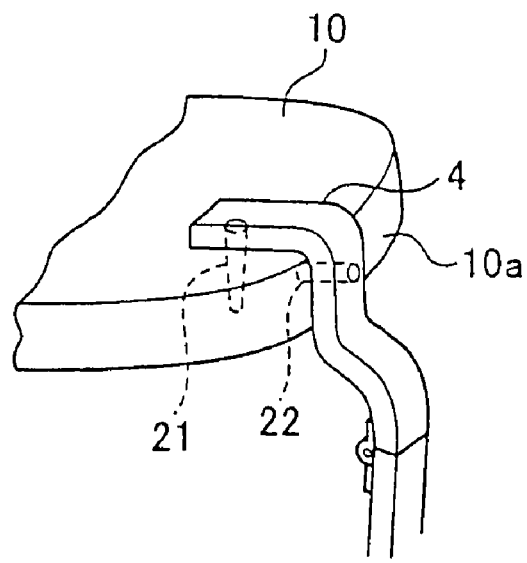
FIG. 11A is a perspective view.
Figure 11B:
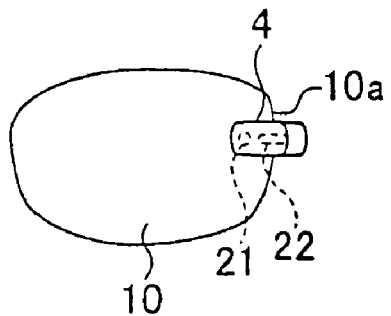
FIG. 11B is a front view.
Figure 12:
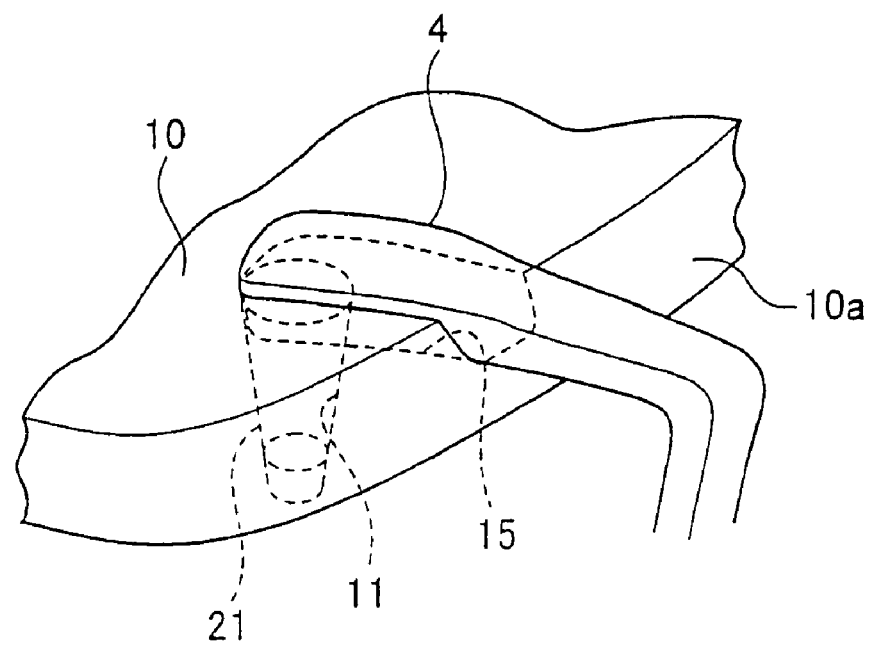
FIG. 12 is a perspective view showing further other example of the rotation preventive means.
Figure 13A:
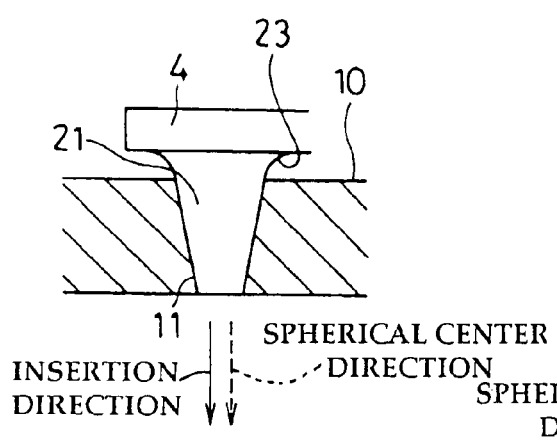
FIG. 13A is a view showing an example of press-fitting the pin in the spherical center direction of a lens.
Figure 13B:
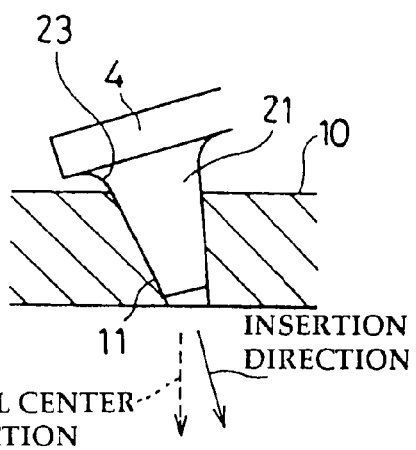
FIG. 13B is a sectional view showing an example of press-fitting the pin in a direction shifted from the spherical center direction of the lens.
Figure 14:
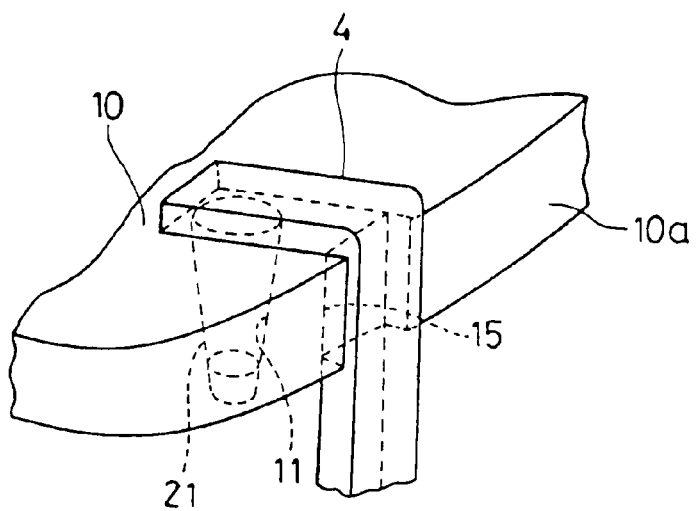
FIG. 14 is a perspective view showing further other example of the rotation preventive means.
Figure 15A:
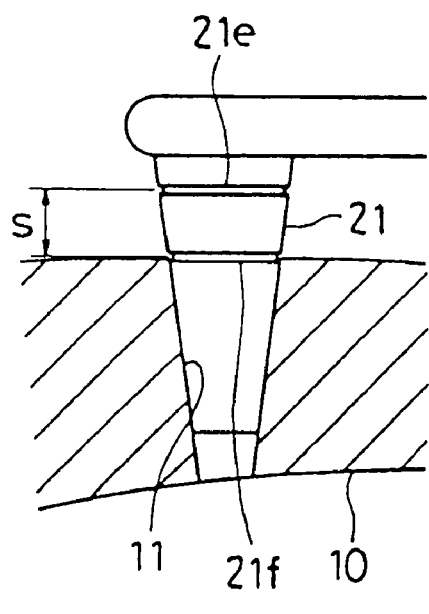
FIG. 15A is a sectional view showing a state before press-fitting the taper pin.
Figure 15B:
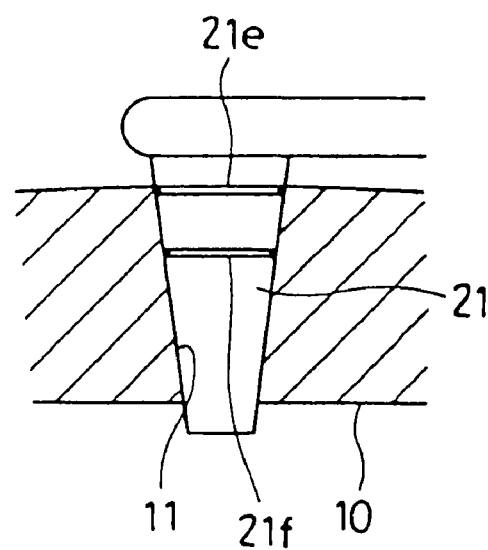
FIG. 15B is a sectional view showing a state of completing the press-fitting of the taper pin.

1 SPECTACLES
4 ENDPIECE (LENS HOLDING MEMBER)
5 BRIDGE (LENS HOLDING MEMBER)
10 SPECTACLE LENS
10A, 10B EDGE SURFACE
11 TAPER HOLE
12 PIN INSERTION HOLE
15 RECESSED GROOVE
21 TAPER PIN
22 ROTATION PREVENTIVE PIN

The invention claimed is:

1. A manufacturing method of a spectacle, which is a manufacturing method of a rimless spectacle for holding a spectacle lens by a lens holding member of a spectacle frame, wherein a taper pin is provided projecting on the lens holding member, said manufacturing method comprising the steps of:
   boring a taper hole having approximately the same taper size as the taper pin, on or through the spectacle lens; and
   directly press-fitting the taper pin into the taper hole, so as to hold the spectacle lens by a press-contact between an inner circumferential surface of the taper hole and an outer circumferential surface of the taper pin.

2. The manufacturing method of the spectacle according to claim 1, wherein the taper hole is bored in a centripetal direction of a base curve of the spectacle lens.

3. The manufacturing method of the spectacle according to claim 1, wherein the taper pin is press-fitted into the taper hole by inserting it into the taper hole at a predetermined pressure.

4. The manufacturing method of the spectacle according to claim 1, wherein the taper pin is press-fitted into the taper hole by inserting the taper pin up to a predetermined position.

5. The manufacturing method of the spectacle according to claim 1, wherein the taper pin is press-fitted into the taper hole in a state that the spectacle lens is previously heated in the step of press-fitting the taper pin into the taper hole.

6. The manufacturing method of the spectacle according to claim 1, wherein the lens holding member is selected in accordance with a depth of the taper hole, from a plurality of members having different lengths of the taper pin.

7. The manufacturing method of the spectacle according to claim 1, wherein after the taper pin is press-fitted into the taper hole, a tip end of the taper pin is cut.

8. The manufacturing method of the spectacle according to claim 1, wherein an irregularity part is provided on the taper pin.

9. The manufacturing method of the spectacle according to claim 1, wherein a rotation preventive means composed of a straight pin parallel to the taper pin is provided in the lens holding member, and a pin insertion hole composed of a straight hole parallel to the taper hole is provided in the spectacle lens, and when the taper pin is press-fitted into the taper hole, the rotation preventive pin is inserted into the pin insertion hole.

10. The manufacturing method of the spectacle according to claim 9, wherein after the rotation preventive pin is inserted into the insertion hole, a space between the rotation preventive pin and the pin insertion hole is filled with resin.

11. The manufacturing method of the spectacle according to claim 9, wherein after resin is injected into the pin insertion hole, the rotation preventive pin is inserted into the pin insertion hole.

12. The manufacturing method of the spectacle according to claim 9, wherein a diameter of the pin insertion hole is larger than an outer shape of the rotation preventive pin.

13. The manufacturing method of the spectacle according to claim 9, wherein the rotation preventive pin is arranged outside the spectacle lens to the ear side from the taper pin.

* * * * *